United States Patent Office 2,731,665
Patented Jan. 24, 1956

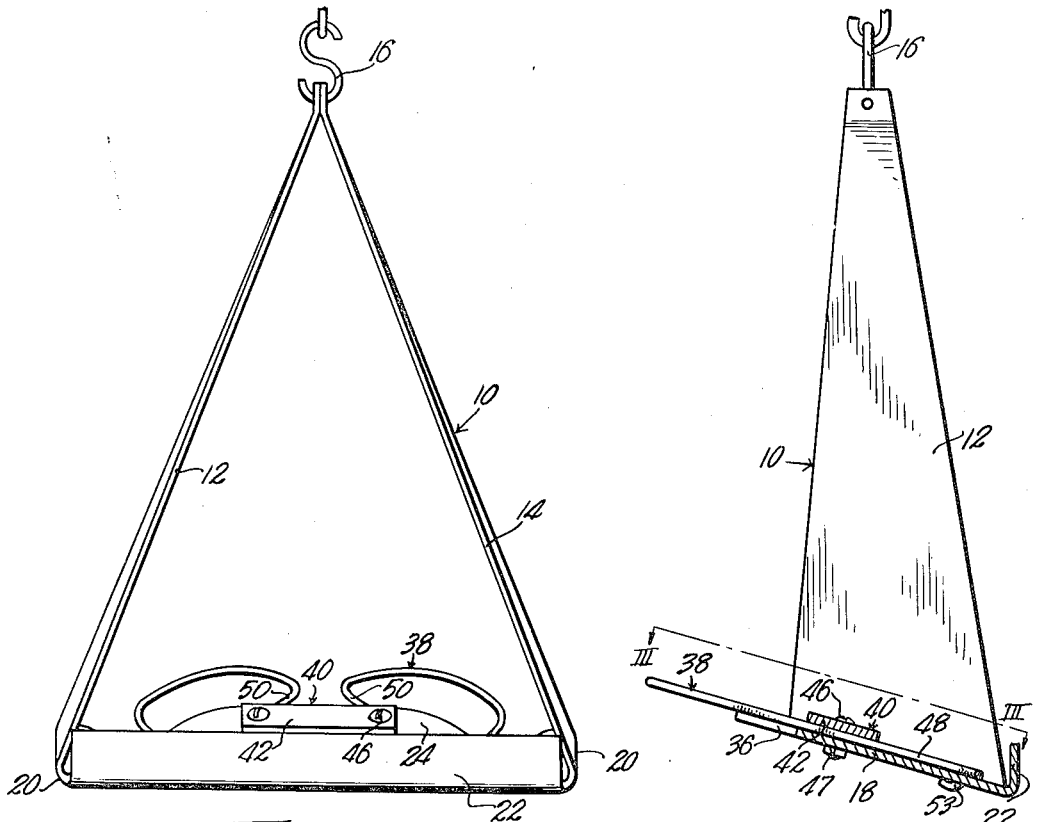
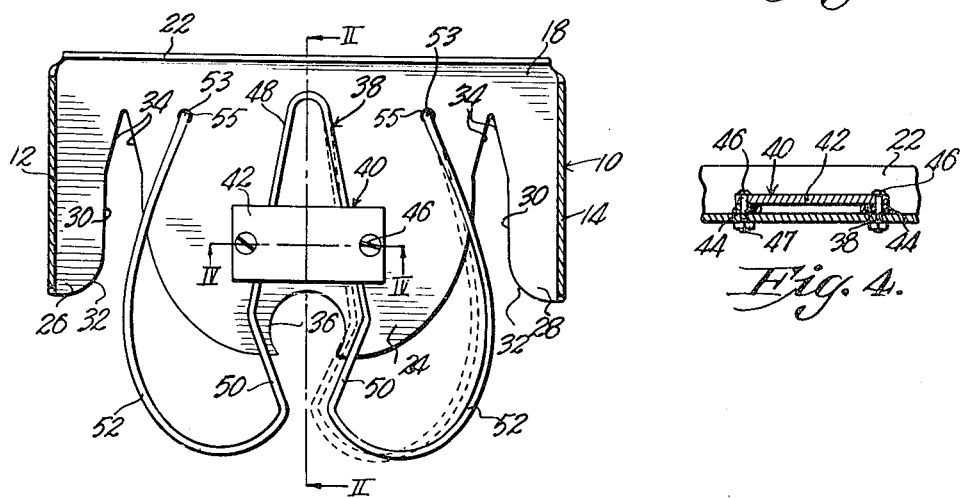

2,731,665
SHACKLE FOR POULTRY DRESSING MACHINES

Ralph S. Zebarth, Hickman Mills, Mo., assignor to Gordon W. Johnson Company, Kansas City, Mo., a corporation of Missouri Application September 5, 1950, Serial No. 183,125

3 Claims. (Cl. 17—44.1)

This invention relates to poultry dressing equipment and more particularly to a shackle for maintaining the poultry being slaughtered, picked, singed or the like, in a suspended condition by the legs thereof throughout such part of the entire process as is desired.

It is the most important object of the present invention to provide a poultry shackle that is inexpensive, simple to use, easy to manufacture and capable of receiving the poultry legs without undue difficulty and releasing the same as and when desired, in a rapid and efficient manner.

It is an important object of the present invention to provide a shackle including a suspendable support having a member that may be plate-like in nature that is in turn provided with one or more elongated slots that taper as the closed end thereof is approached, whereby to releasably grip the poultry leg and hold the same firmly and rigidly in place during the slaughtering, picking and other dressing operations.

It is a further object of this invention to provide a poultry shackle that includes a shiftable member preferably of a resilient nature cooperable with the slot or slots of the support in yieldably holding the poultry leg within the slot until such time as it is desired to release the dressed fowl.

It is a still further object of this invention to provide a poultry shackle that includes as a part of the support thereof a flat, inclined plate having a pair of spaced-apart, elongated slots or recesses of a tapered nature for receiving the legs of the poultry, the closed ends of the slots being at the lowermost end of the support whereby the inherent weight of the fowl causes the shackle to progressively tighten its grip upon the legs during suspension of the poultry.

Other objects include the way in which the resilient, releasable holding means serves as a slot restricting means; the manner of forming the yieldable holding structure in the form of a wire loop partially crossing corresponding slots; the manner of providing means for receiving the neck of the fowl; and many more minor objects, all of which will be made clear as the specification hereof progresses.

The preferred embodiment of the present invention is shown in the drawing, wherein:

Figure 1 is a rear elevational view of the shackle for poultry dressing machines hereof.

Fig. 2 is a vertical, cross-sectional view taken on line II—II of Fig. 3.

Fig. 3 is a transverse, cross-sectional view taken on line III—III of Fig. 2; and Fig. 4 is a fragmentary, detailed, sectional view taken on line IV—IV of Fig. 3.

The entire shackle about to be described is made from a minimum number of parts and includes a support broadly designated by the numeral 10, that is made from an initially flat piece of bendable sheet material. Support 10 is triangular-shaped and includes a pair of identical side elements 12 and 14, each of which is also substantially triangular with the apex end thereof having openings formed therein for receiving an S-shaped bail member 16, whereby the shackle may be suspended from an overhead conveyor, not shown.

The sides 12 and 14 diverge as the lowermost base ends thereof are approached where the same join with a flat, interconnecting plate or slotted member 18 by lines of bend 20. The plate 18 has its transverse axis disposed at an angle with respect to the horizontal when the support 10 is in a suspended condition depending from the bail member 16. An upturned flange 22 extends along the entire length of the lowermost longitudinal edge of the plate 18.

Plate 18 is provided with a substantially semi-circular, central portion 24 and a pair of opposed side portions 26 and 28 defining a pair of spaced-apart, substantially parallel, elongated slots 30 having their longitudinal axes extending transversely of the plate 18. It is noted that a portion of the innermost edge of the slots 30 is arcuate by virtue of the contour of the central portion 24. The innermost edge of each of the side portions 26 and 28 adjacent the uppermost longitudinal edge of the plate 18, is also rounded as at 32.

Consequently, the width of the slots 30 progressively increases as the closed end thereof is approached. Each of the slots 30 is provided with a V-shaped portion 34 having straight edges that converge as the closed end of the slots 30 is approached, it being noted that such closed ends are adjacent the flange 22 or the lowermost longitudinal edge of plate 18.

The outermost extremities of the arcuate center portion 24 extend outwardly beyond the proximal free ends of the side portions 26 and 28 and has a centrally disposed arcuate opening 36 formed therein.

The plate 18 carries a holding member broadly designated by the numeral 38 and preferably upon the uppermost face thereof through the medium of a guide 40 member 38 being of double-looped configuration, that is, substantially omega-shaped. Guide 40 includes a flat, polygonal bar 42, a pair of spacers 44 interposed between bar 42 and the upper face of plate 18, and a pair of fastening elements that may comprise bolts 46 passing through bar 42, the proximal spacers 44 and the plate 18, together with nuts 47 for the bolts 46.

The holding member 38 is made from an initially straight length of spring wire material bent and rebent upon itself to present a substantially V-shaped, central bight portion 48 that is slidably interposed between plate 18 and bar 42. The outermost free ends of the legs of the bight portion 48 are each provided with a straight portion 50, which portions 50 converge as the outermost ends thereof are approached.

It is noted that the arcuate opening 36 of the plate 18 is substantially embraced by the portions 48 and 50 of the holding member 38, although the outermost ends of the portions 50 are in spaced-apart relationship, the distance between such ends being less than the width of the inlet opening for hole 36. Each portion 50 of the member 38 is provided with an arcuate stretch or slot-restricting means 52 that extends outwardly and rearwardly therefrom to a point intersecting or partially crossing and thereby restricting the openings 30 of plate 18. The free ends of the arcuate member 52 are pivotally connected to the plate 18 by being hooked as at 53 through openings 55 in the plate 18. All of the parts of the resilient holding member 38 are in a common plane parallel to and immediately above the uppermost face of plate 18. The swingable movement of the stretches 52 of holding member 38 as the same are caused to slide across the uppermost face of plate 18, is illustrated by dotted lines in Fig. 3 of the drawing. Manifestly, as the members 52 are caused to move together or toward the bight portion 48, the inlet end of the openings 30 becomes greater and permits the insertion and/or removal of poultry legs with respect to the slots 30.

When the shackle is placed in use to receive the poultry legs with the fowl suspended below the plate 18, and while the support 10 depends from a conveyor or the like by means of bail 16, the legs may easily and quickly be forced into the slots 30 without the necessity of grasping the holding member 38. The stretches 52 of member 38 will readily yield to the dotted line position shown in Fig. 3 as the legs are forced into the slots 30. The arcuate edges of the slots 30 and the rounded nature of the members 52, permit easy insertion of the legs as the same slide along portions 52 and around curved ends 32. As the legs are forced downwardly and rearwardly along the slots 30 to the V-shaped portion 34 thereof, slots 30 will automatically grip the legs and hold the same tightly in place throughout the time the fowl remains on the shackle. It is to be noted that the inherent weight of the chicken, turkey or other fowl, serves to bind the legs thereof more tightly within the slots 30 as the legs tend to move toward the lowermost end of the plate 18 and consequently, toward the closed end of the slots 30. When it is desired to remove the fowl from the shackle, the legs thereof may be grasped and pulled outwardly with respect to the slots 30, the arcuate portions 52 of holding member 38 readily yielding to pressure and permitting movement of the legs through the outermost open end of slot 30.

It is seen further that the arcuate opening 36 of plate 18 may conveniently serve as a means for suspending the fowl by the head thereof. Such procedure is accomplished by merely moving the neck into the opening 36 since the diameter of the latter is substantially the same or only slightly greater than the average size of the neck of a fowl.

The distance between the outermost and uppermost ends of the branches 50 of member 38 is, however, slightly less than the diameter of the average fowl neck. Accordingly, as the hole 36 is placed in use, it is necessary that the outermost ends of the branches 50 be sprung apart. Accidental displacement of the poultry from the opening 36 will not cause loss of the same therefore, because of the holding effect of branches 50. In this same manner, when the fowl is suspended by the legs, the loops 52 will prevent loss of the fowl during slaughtering when the legs tend to move toward the open ends of slots 30.

Fig. 3 of the drawing further illustrates the way in which the member 38 bends at the closed end of the bight portion 48 thereof as the legs of the bight portion 48 move together in response to springing of the arcuate lengths 52 toward the dotted line position. In other words, movement or sliding of the arcuate members 52 causes pivoting thereof in the holes 55 as the legs of bight 48 slide between bar 42 and plate 18.

It is to be noted further that the entire device is formed to prevent as nearly as possible, any scratching or snagging of the shackle upon tanks and other apparatus used in the poultry dressing plant adjacent to the path of travel of the shackles. The rounded and streamlined nature of the support 10, as well as all protuberances of the shackle itself, accomplish this novel result.

Many details of construction may be changed or varied as desired without departing from the spirit of this invention and it is, therefore, desired to be limited only by the scope of the appended claims.

Having thus described the invention, what is claimed as new and desired to be secured by Letters Patent is:

1. A poultry shackle comprising a support element adapted to be suspended at its uppermost extremity; an elongated plate rigidly secured to the lowermost extremity of the element and supported by the latter in transversely inclined disposition when the element is normally suspended, said plate being provided with a pair of spaced, elongated, transverse, fowl leg-receiving slots extending downwardly from the uppermost edge of the plate toward the lowermost edge thereof; a substantially omega-shaped, resilient holding member having a bight, including a substantially V-shaped central portion extending laterally in one direction, and a pair of opposed, outer, arcuate stretches extending from the opposite extremities of the bight in said one direction and each terminating in an end; and means attaching the ends of said member to said plate between the slots with a part of said central portion and one part of each of said stretches slidably resting upon the upper face of the plate and another part of each of said stretches partially overlapping a corresponding slot adjacent the uppermost end of the latter to present yieldable, gate structure therefor.

2. In a poultry shackle as set forth in claim 1, wherein said ends of said member are pivotally attached to said plate.

3. In a poultry shackle as set forth in claim 2, wherein is provided guide structure on the plate for holding said part of the central portion slidably superimposed upon the plate between the slots and for limiting movement of said part of the central portion toward either slot while permitting free sliding movement thereof both in said one direction and oppositely thereto.

References Cited in the file of this patent

UNITED STATES PATENTS

| | | |
|---|---|---|
| 158,208 | Hall | Dec. 29, 1874 |
| 290,268 | Read | Dec. 18, 1883 |
| 722,546 | Werle | Mar. 10, 1903 |
| 1,742,569 | Barker et al. | Jan. 7, 1930 |
| 1,866,683 | Tinnes | July 12, 1932 |
| 2,035,948 | DeVout | Mar. 31, 1936 |
| 2,301,594 | Voigtritter | Nov. 10, 1942 |
| 2,405,638 | Bilek | Aug. 13, 1946 |